(12) United States Patent
Zeng (10) Patent No.: US 10,444,802 B2
(45) Date of Patent: *Oct. 15, 2019

(54) CAMERA ASSEMBLY, ELECTRONIC APPARATUS AND MOBILE TERMINAL

(71) Applicant: GUANGDONG OPPO MOBILE TELECOMMUNICATIONS CORP., LTD., Dongguan, Guangdong (CN)

(72) Inventor: Zanjian Zeng, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,751

(22) Filed: Aug. 28, 2018

(65) Prior Publication Data

US 2019/0138062 A1 May 9, 2019

(30) Foreign Application Priority Data

Nov. 3, 2017 (CN) .......................... 2017 1 1076923
Nov. 3, 2017 (CN) ...................... 2017 2 1461098 U (51) Int. Cl.
*G06F 1/16* (2006.01)
*H04M 1/02* (2006.01)
*H04N 5/225* (2006.01)

(52) U.S. Cl.
CPC .......... *G06F 1/1686* (2013.01); *G06F 1/1605* (2013.01); *H04M 1/0235* (2013.01);
(Continued)

(58) Field of Classification Search
CPC . H04M 1/0264; H04N 5/23238; H04N 5/265; H04N 5/2251; G06F 1/1686
See application file for complete search history.

(56) References Cited

U.S. PATENT DOCUMENTS 7,907,840 B2   3/2011  Schack et al.
9,692,953 B2   6/2017  Xiong et al.
(Continued)

FOREIGN PATENT DOCUMENTS

CN   2745106 Y   12/2005
CN   2762162 Y    3/2006
(Continued)

OTHER PUBLICATIONS

International search report issued in corresponding International application No. PCT/CN2018/102973, dated Nov. 27, 2018 (4 pages).

(Continued)

*Primary Examiner* — Adrian S Wilson
(74) *Attorney, Agent, or Firm* — Ladas & Parry LLP (57) ABSTRACT

A camera assembly may include a fixed holder, sliding means connected to the fixed holder, configured to move relative to the fixed holder and including a magnet, a camera module arranged on the sliding means and configured to move between a first position at which the camera module extends out of the fixed holder and a second position at which the camera module retracts into the fixed holder with movement of the sliding means and an electromagnetic element, arranged on the fixed holder and configured to generate repulsive force and attractive force to the magnet to drive the sliding means to move, such that the camera module could move between the first position and the second position.

20 Claims, 9 Drawing Sheets

(52) U.S. Cl.
CPC ....... *H04M 1/0237* (2013.01); *H04M 1/0264* (2013.01); *H04N 5/2252* (2013.01); *H04N 5/2253* (2013.01)

(56) References Cited

U.S. PATENT DOCUMENTS

| | | | |
|---|---|---|---|
| 9,736,383 | B2 | 8/2017 | Evans et al. |
| 9,834,154 | B2 | 12/2017 | Carson |
| 10,021,296 | B2* | 7/2018 | Fan .................... H04N 5/23238 |
| 2005/0014527 | A1 | 1/2005 | Chambers et al. |
| 2006/0033832 | A1 | 2/2006 | Shin |
| 2010/0124955 | A1 | 5/2010 | Lin |
| 2014/0218587 | A1 | 8/2014 | Shah |
| 2015/0009349 | A1 | 1/2015 | Kim |
| 2015/0189175 | A1 | 7/2015 | Fan et al. |
| 2015/0281525 | A1 | 10/2015 | Thakur |
| 2016/0191760 | A1 | 6/2016 | Wu |
| 2017/0064054 | A1 | 3/2017 | Lombardi et al. |
| 2017/0094038 | A1 | 3/2017 | Chen et al. |
| 2018/0262663 | A1* | 9/2018 | Zhang ................ H04M 1/0264 |

FOREIGN PATENT DOCUMENTS

| | | | |
|---|---|---|---|
| CN | 2837894 | Y | 11/2006 |
| CN | 201066423 | Y | 5/2008 |
| CN | 101236353 | A | 8/2008 |
| CN | 203206372 | U | 9/2013 |
| CN | 104618542 | A | 5/2015 |
| CN | 204408431 | U | 6/2015 |
| CN | 105049686 | A | 11/2015 |
| CN | 205029708 | U | 2/2016 |
| CN | 105553200 | A | 5/2016 |
| CN | 105554196 | A | 5/2016 |
| CN | 205510137 | U | 8/2016 |
| CN | 205725913 | U | 11/2016 |
| CN | 06850896 | A | 6/2017 |
| CN | 206251153 | U | 6/2017 |
| CN | 107071242 | A | 8/2017 |
| CN | 206413083 | U | 8/2017 |
| CN | 207118136 | U | 3/2018 |
| CN | 207118136 | U | 3/2018 |
| CN | 207354463 | U | 5/2018 |
| JP | 2003188968 | A | 7/2003 |
| KR | 20060096681 | A | 9/2006 |
| TW | 201435467 | A | 9/2014 |
| WO | WO2014161401 | A1 | 10/2014 |
| WO | WO2015148061 | A1 | 10/2015 |

OTHER PUBLICATIONS

European search report issued in corresponding International application No. EP18190352.7, dated Dec. 3, 2018 (17 pages).
International search report for Application No. PCT/CN2017/111807, dated Jan. 26, 2018 (12 pages).
European search report for Application No. EP17202810.2, dated Mar. 15, 2018 (9 pages).
First Office Action from China patent office in a counterpart Chinese patent Application 201710132546.6, dated Jan. 28, 2019 (13 pages).
Second Office Action from China patent office in a counterpart Chinese patent Application 201710132546.6, dated Apr. 11, 2019 (15 pages).
First Office Action from Taiwan patent office in a counterpart Taiwan patent Application 106146576, dated Sep. 12, 2018 (5 pages).
Non Final Rejection from United States patent office in a counterpart U.S. Appl. No. 15/824,490, dated Sep. 26, 2018 (12 pages).
Final Rejection from United States patent office in a counterpart U.S. Appl. No. 15/824,490, dated Feb. 8, 2019 (14 pages).

* cited by examiner

CAMERA ASSEMBLY, ELECTRONIC APPARATUS AND MOBILE TERMINAL

CROSS REFERENCE TO RELATED APPLICATIONS

This application claims priorities to Chinese Patent Application No. 201711076923.5, filed on Nov. 3, 2017, and Chinese Patent Application No. 201721461098.6, filed on Nov. 3, 2017, the contents of which are herein incorporated by reference in their entireties.

TECHNICAL FIELD

The described embodiments relate to electronic products, and in particular to a camera assembly, an electronic apparatus and a mobile terminal with a slidable device.

BACKGROUND

Front camera module or a receiver module of a current mobile terminal is covered by a screen. It is necessary to define a hole for the camera module or a receiver module on a glass substrate of the screen for signal to penetrate, that is, the functional component may occupy a space of the screen. As a result, the ratio of a display area of the screen to an area of the screen is reduced, and it is difficult for the mobile terminal to achieve full screen.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

In order to more clearly understand the objective, the features and advantages of the present disclosure, the present disclosure will be described in details with reference to the drawings and the embodiments. It should be noted that, the embodiments and the features recited in the embodiments of the present disclosure may be combined with each other without confliction.

Plenty of specific details are described in the embodiments in order to better understand the technical solution of the present disclosure. However, the embodiments described here are only some exemplary embodiments, not all the embodiments. Based on the embodiments described in the present disclosure, one skilled in the art may acquire all other embodiments without any creative work. All these shall be covered within the protection scope of the present disclosure.

Further, the embodiments are described with reference to the accompanying drawings, in order to illustrate specific embodiments of the present disclosure that can be implemented. In the specification, it can be understood that, directional terms recited in the present disclosure, such as "top", "bottom", "upper", "lower", "front", "rear", "left", "right", "inner", "outer", "side plate", "above", "under", and the like, refer to the orientations in the accompanying drawings. Thus, the directional terms used here are only for better and more clearly describing and understanding the present disclosure, and are not intended to indicate or imply that the devices or the elements are disposed to locate at the specific directions or are structured and performed in the specific directions, which could not to be understood as limiting the present disclosure. In the present disclosure, unless specified or limited, otherwise, terms "mounted", "connected", "coupled", "disposed", "arranged", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

In addition, terms such as "first", "second", "third", and the like are used herein for purposes of description, and are not intended to indicate or imply relative importance or significance or to imply the number of indicated technical features. Thus, the feature defined with "first", "second", "third", and the like may include one or more of such a feature. In the description of the present disclosure, "multiple" means two or more, unless specified otherwise. Moreover, the terms "comprise", "include" or any other variations thereof are meant to cover non-exclusive including, so that the process, method, article or device comprising a series of elements do not only include those elements, but also include other elements that are not explicitly listed or also include the inherent elements of the process, method, article or device. In the case that there are no more restrictions, an element qualified by the statement "comprises a . . . " does not exclude the presence of additional identical elements in the process, method, article or device that includes the said element.

In the following, an electronic apparatus 100 provided in embodiments of the present disclosure will be described with reference to drawings.

The electronic apparatus 100 may include intelligent devices such as tablet PCs, mobile terminals, cameras, personal computers, laptops, in-vehicle devices, wearable equipment, and the like. It should be understood that "electronic apparatus 100" in the present disclosure may include, but be not limited to an apparatus receiving/transmitting communication signals via wired connection, for example, public switched telephone network (PSTN), digital subscriber line (DSL), digital cable, electric cable and/or another data connection/network, and/or cellular network, Wireless Area Networks (WLAN), digital television network such as DVB-H (Digital Video Broadcasting Handheld) network, satellite network, AM-FM broadcast transmitter and/or another communication terminal of wireless interface. The electronic apparatus 100 may also include a satellite or cellular telephone, a personal communication system terminal with cellular radio telephone and data processing, facsimile and data communication, beeper, or other electronic apparatuses with a transceiver.

Figure 1:
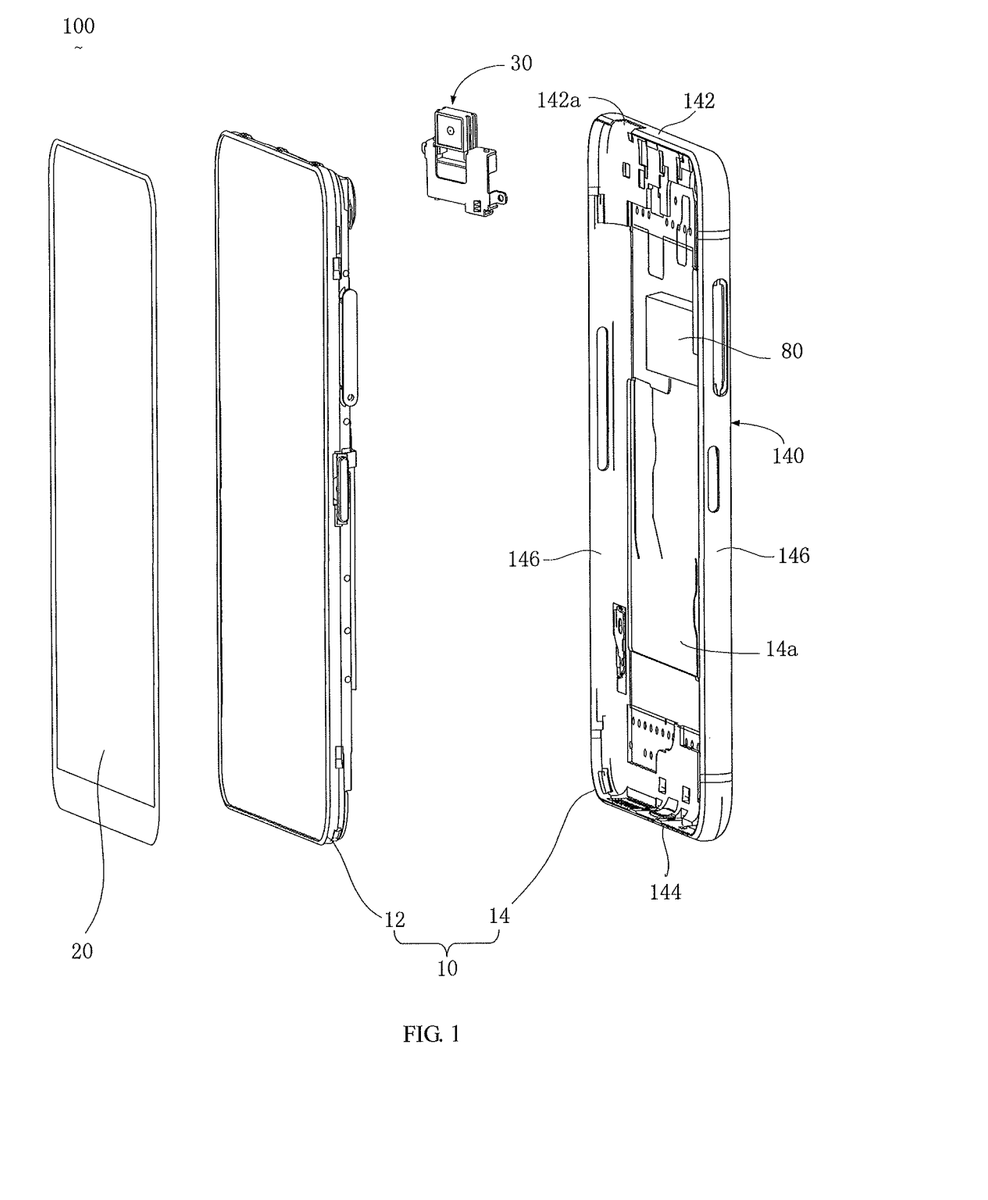
FIG. 1 is an exploded isometric view of a electronic apparatus according to an embodiment of the present disclosure.

Referring to FIG. 1, the electronic apparatus 100, according to an exemplary embodiment, may include a housing 10, a screen 20 engaged with the housing 10, a slidable assembly 30 and a controller 80. The slidable assembly 30 and the controller 80 may be disposed in the housing 10 and under the screen 20.

The housing 10, which may sometimes be referred to as a case, may be formed of plastic, glass, ceramics, fiber composites, metal (e.g., stainless steel, aluminum, etc.), other suitable materials, or a combination of these materials. In some situations, parts of housing 10 may be formed from dielectric or other low-conductivity material. In other situations, the housing 10 or at least some of the structures that make up the housing 10 may be formed from metal elements.

In an embodiment, the housing 10 may have a rectangular configuration and include a front shell 12 and back shell 14. The front shell 12 may be connected to and surrounding the back shell 14. The back shell 14 may include a bottom wall 140, a first housing wall 142, a second housing wall 144 opposite to the first housing wall 142, and two third housing walls 146 opposite to each other and connected to the first housing wall 142 and the second housing wall 144. The bottom wall 140, the first housing wall 142, the second housing wall 144 and the two third housing walls 146 may define a chamber 14a, which may also be called as a cavity, to receive the slidable assembly 30, the controller 80 and other electronic components (not shown), such as a main board and a battery etc. In particularly, the slidable assembly 30, the controller 80 and the electronically components may be arranged between the screen 20 and the back shell 14. In some embodiments, an antenna slot (not shown) may be defined in the back shell 14, and it may be communicated with an antenna component inside the housing 10. In this case, the first housing wall 142 may define a through hole 142a. Alternatively, the housing 10 may have other configurations, such as round, long round and ellipse etc.

The screen 20, according to an exemplary embodiment, may be embedded in the front shell 12 and cover the back shell 14. The screen 20 may include pixels formed from light-emitting diodes (LEDs), organic LEDs (OLEDs), plasma cells, electrowetting pixels, electrophoretic pixels, liquid crystal display (LCD) components, or other suitable pixel structures. A screen cover layer such as a layer of clear glass or plastic may cover the surface of the screen 20 or the outermost layer of the screen 20 may be formed from a color filter layer, thin-film transistor layer, or other display layer. In this embodiment, the screen 20 may further incorporate touch electrodes and be used as a touch screen for inputting information.

Figure 2:
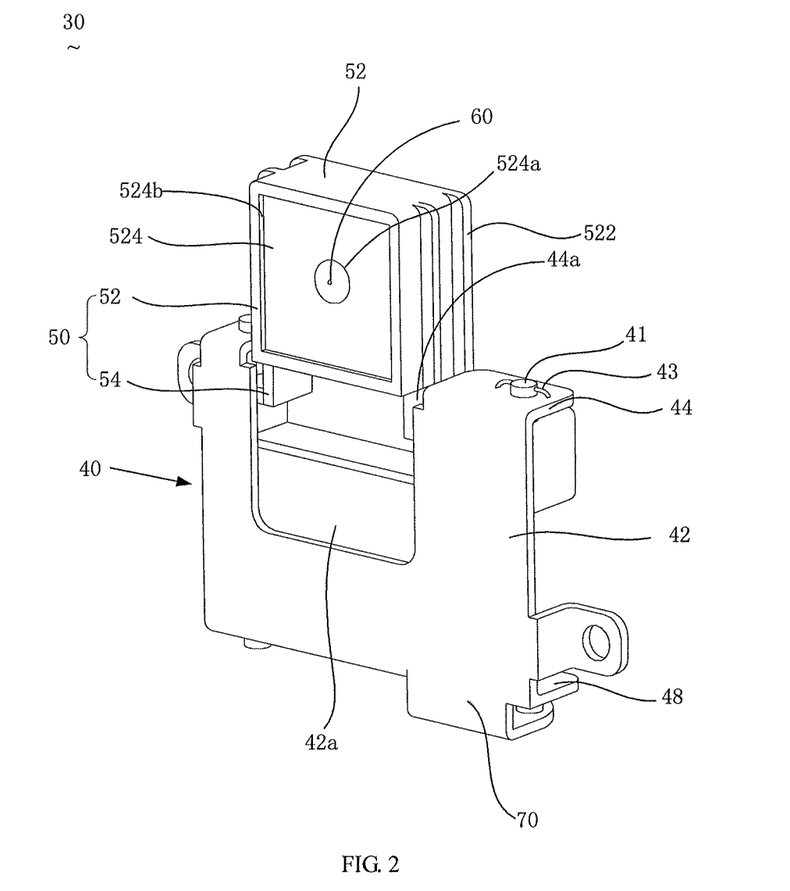
FIG. 2 is an enlarged view of a slidable assembly in FIG. 1.
Figure 4:
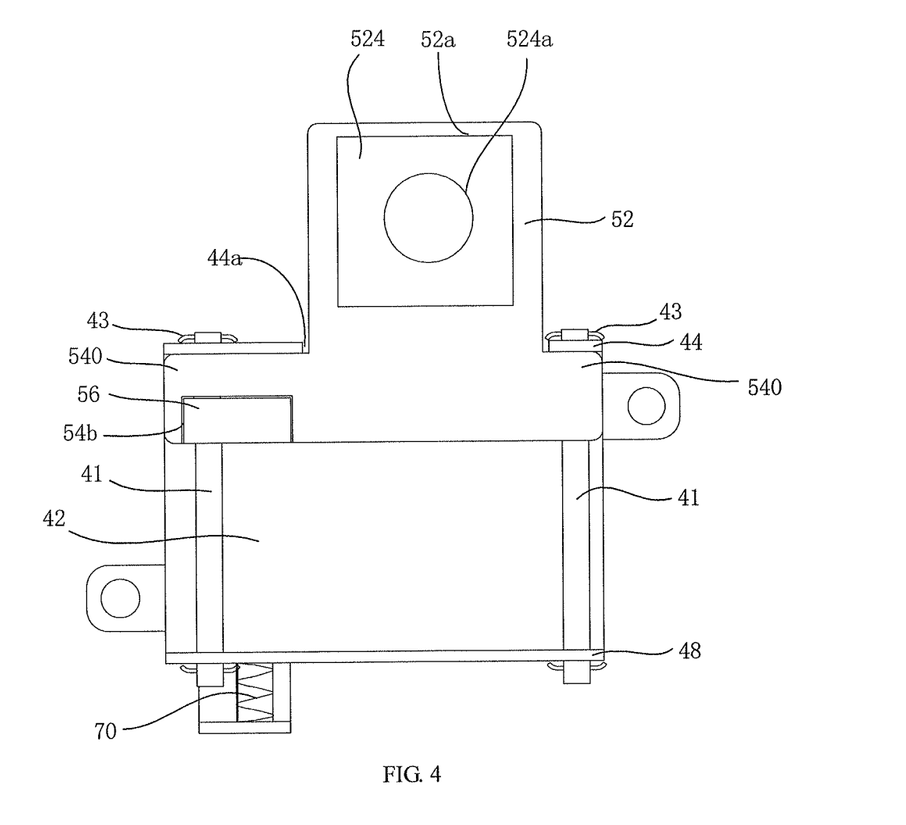
FIG. 4 is a plan view of the fixed holder and the slidable bracket in FIG. 3, wherein the slidable bracket is at another position.

Referring to FIGS. 2 and 4, the slidable assembly 30, which may also be called as a functional assembly in the present embodiment, may include a fixed holder 40 fixed on the back shell 14, a slidable bracket 50 connected to the fixed holder 40, a slidable device 60 arranged on the slidable bracket 50 and an electromagnetic element 70 arranged on the fixed holder 40. The slidable bracket 50 may be configured to move relative to the fixed holder 40 such that the slidable device 60 could extend out of or retract into the housing 10. The electromagnetic element 70 may be configured to drive the slidable bracket 50 to move.

The fixed holder 40 may include a bottom plate 42 substantially parallel to the moving direction of the slidable bracket 50, a first side plate 44 extending substantially perpendicularly from an end of the bottom plate 42, a second side plate 48 extending substantially perpendicularly from the other end of the bottom plate 42 and opposite to the first side plate 44, and a guiding element, such as a pair of guiding rods 41 arranged at two sides of the fixed holder 40 and substantially perpendicularly to the first side plate 44 and the second side plate 48.

The first side plate 44 may define a first opening 44a, through which the slidable device 60 could extend out of or retract into the fixed holder 40. The bottom plate 42 may define a second opening 42a communicating with the first opening 44a.

The guiding rods 41 may be configured to guide the movement of the slidable bracket 50. In this embodiment, an end of each of the guiding rods 41 may pass through the first side plate 44 and be connected to a stop member 43, the other end of each of the guiding rods 41 may pass through the second side plate 48 and be connected to another stop member 43. Therefore, the guiding rods 41 may be connected to the first side plate 44 and the second side plate 48, that is, the stop member 43 could prevent the guiding rods 41 from disengaging from the first side plate 44 and the second side plate 48.

In an embodiment, the stop member 43 may be a dam bar substantially perpendicular to the guiding rod 41. The dam bar may pass through the guiding rod 41. The dam bar may have a cross sectional shape of round, rectangle or triangle. Each end of the dam bar may be bent toward the fixed holder 40. Therefore, the dam bar at each end of the guiding rods 41 could lock each of the guiding rods 41 on the first side plate 44 and the second side plate 48.

Alternatively, the stop member 43 may be a nut screwing with the guiding rod 41. In some embodiments, the stop member 43 may also be glue, which could attach the guiding rod 41 to the first side plate 44 and the second side plate 48 firmly.

Figure 3:
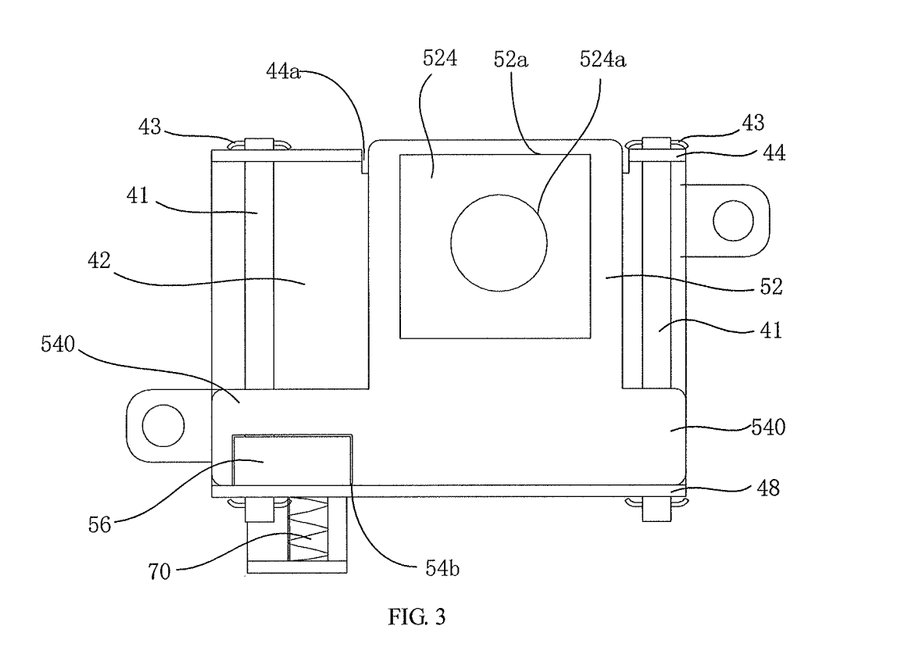
FIG. 3 is a plan view of a fixed holder and a slidable bracket according to an embodiment of the present disclosure.
Figure 5:
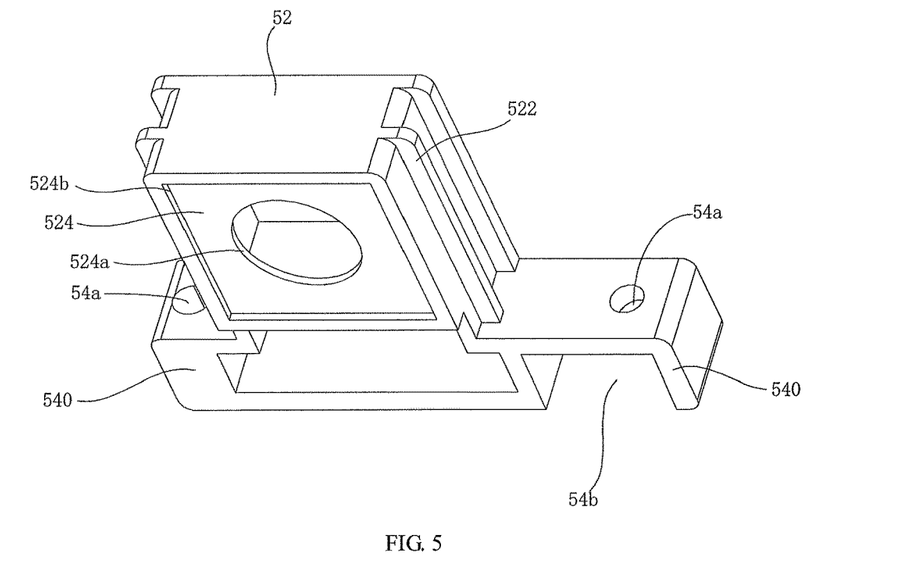
FIG. 5 is an isometric view of the slidable bracket in FIG. 2.

Referring to FIG. 5 and combining with FIGS. 2 to 4, the slidable bracket 50, which may also be called as a sliding means, may include a main body 52 defining a first slot 52a configured to receive the slidable device 60, a mating body 54 connected to the main body 52 and configured to match with the guiding element to guide the movement of the slidable bracket 50, and a magnet 56 arranged on the mating body 54. In other embodiments, the entire slidable bracket 50 may be a magnet, that is, the entire slidable bracket 50 may be made of magnetic materials, such as, iron, cobalt, nickel or the like.

Specifically, in this embodiment, the main body 52 may include a bottom wall 524 in the first slot 52a. The bottom wall 524 may define a through hole 524a for light or other signal to penetrate to the slidable device 60, such that the slidable device 60 could receive light or other signal. For example, the slidable device 60 may be a camera module, the through hole 524a may be a light hole for ambient light to pass through and reach the camera. Furthermore, a lens groove 524b may be defined by the bottom wall 524 opposite to the first slot 520 and around the through hole 524a. A lens (not shown) may be arranged in the lens groove 524b, which could prevent the external impurities, such as, dust, liquid or the like, from entering into the slidable device 60. An outer wall of the main body 52 may provide with a plurality of reinforcing ribs 522. An end of the reinforcing ribs 522 may extend to the mating body 54 and be connected to the mating body 54, which could increase the strength of the slidable bracket 50, thereby protecting the slidable bracket 50 from being damaged during moving.

The mating body 54 may define two guiding holes 54a to match with the guiding rods 41. Specifically, the mating body 54 may include two mating portions 540 opposite to each other. One of the mating portions 540 may be connected a side of the main body 52 and define one of the guiding holes 54a, the other one of the mating portions 540 may be connected the other side of the main body 52 and define the other one of the guiding holes 54a. One of the guiding rods 41 may pass through one of the guiding holes 54a, the other one of the guiding rods 41 may pass through the other one of the guiding holes 54a. Therefore, the slidable bracket 50 may move along the guiding rods 41. In other embodiments, the guiding element may include one, three or more guiding rods.

The mating body 54 of this embodiment may further define a second slot 54b to receive the magnet 56. The second slot 58 may communicate with the guiding hole 542. The guiding rod 41 may pass through the magnet 56.

Figure 6:
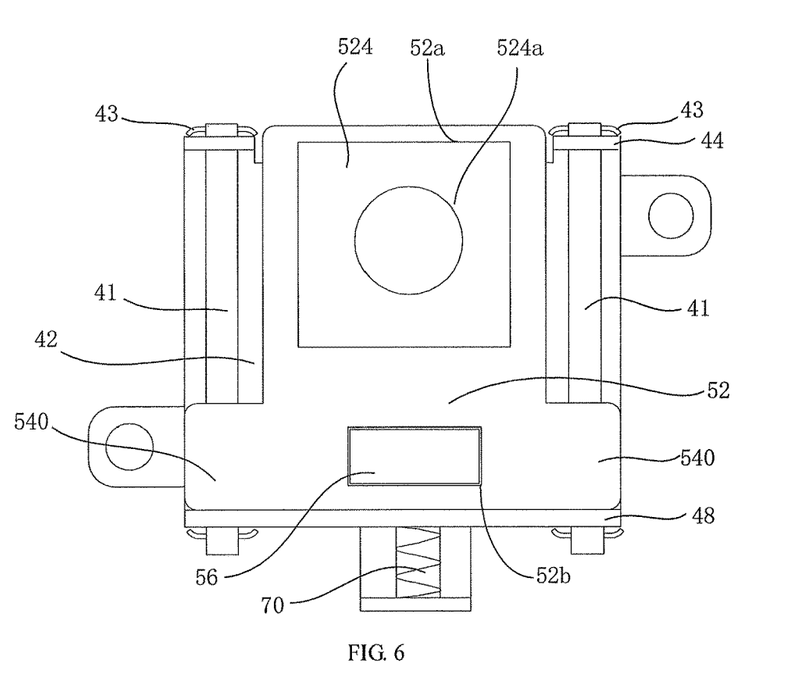
FIG. 6 is a plan view of the fixed holder and the slidable bracket according to another embodiment of the present disclosure.

Referring to FIG. 6, according to another embodiment of the present disclosure, the main body 52 may define the second slot 52b for receiving the magnet 56. In particularly, an end of the main body 52 near the electromagnetic element 70 may define the second slot 52b. In this way, space occupied by the mating body 54 may be reduced, and thus the volume of the slidable assembly 30 could be reduced. Furthermore, it could make direction of magnetic force subjected by the magnet 56 be more closed to the center of gravity of the slidable bracket 50 to arrange the magnet 56 in the main body 52. As a result, the moving stability of the slidable bracket 50 could be increased.

Figure 7:
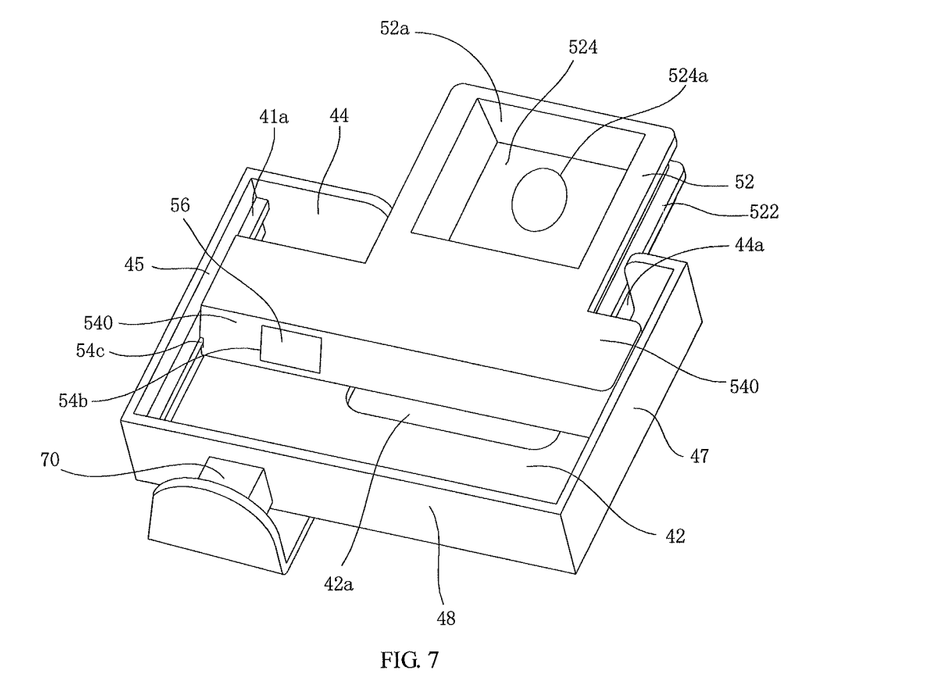
FIG. 7 is an isometric view of the fixed holder and the slidable bracket according to still another embodiment of the present disclosure.

In some embodiments, referring to FIG. 7, the two guiding rods 41 may be replaced by two guiding rails 41a. In particularly, the fixed holder 40 may further include a third side plate 45 extending substantially perpendicularly from an end of the bottom plate 42 and a fourth side plate 47 extending substantially perpendicularly from the other end of the bottom plate 42 and opposite to the third side plate 45. The third side plate 45 may be connected to both the first and second side plate 44, 48. The fourth side plate 47 may be connected to both the first and second side plate 44, 48. The third side plate 45 and the fourth side plate 47 may be substantially parallel to the moving direction of the slidable bracket 50. One of the guiding rods 41 may be provided on the third side plate 45, the other one of the guiding rails may be provided on the fourth side plate 47. The mating body 54 may be arranged between the third side plate 45 and the fourth side plate 47. The mating body 54 may define two guiding grooves 54c. One of the guiding rails 41a may be inserted into one of the guiding grooves 54c, the other one of the guiding rails may be inserted into the other one of the guiding grooves 54c.

The magnet 56 of an embodiment may be a permanent magnet. In other embodiments, the magnet 56 of an embodiment may also be a electromagnet.

The slidable device 60 may be configured to move between a first position at which the slidable device 60 extends out of the chamber 14a and a second position at which the slidable device 60 retracts into the chamber 14a. Specifically, the slidable device 60 may extend out of the housing 10 or retract back into the housing 10 through the first opening 44a and the through hole 142a. Moving direction of the slidable device 60 may be parallel to the bottom wall 140.

Figure 8:
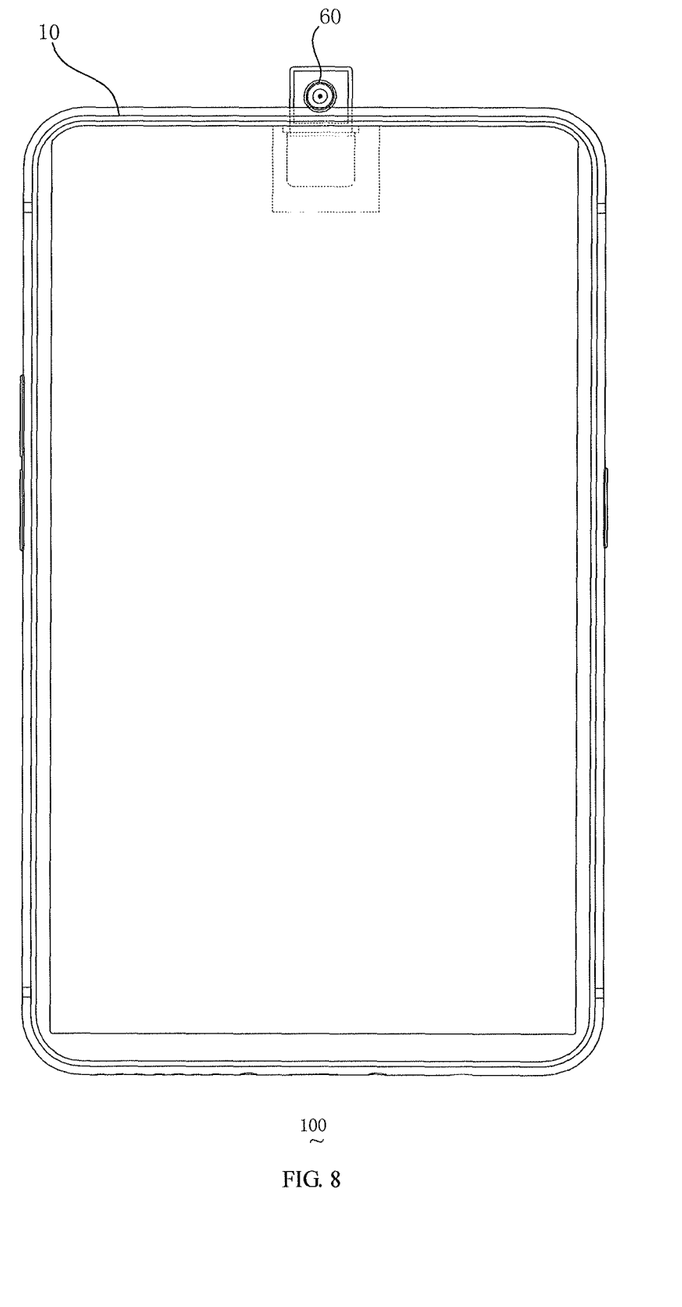
FIG. 8 is a front view of a electronic apparatus according to an embodiment of the present disclosure, wherein the slidable device is at the first position.
Figure 9:
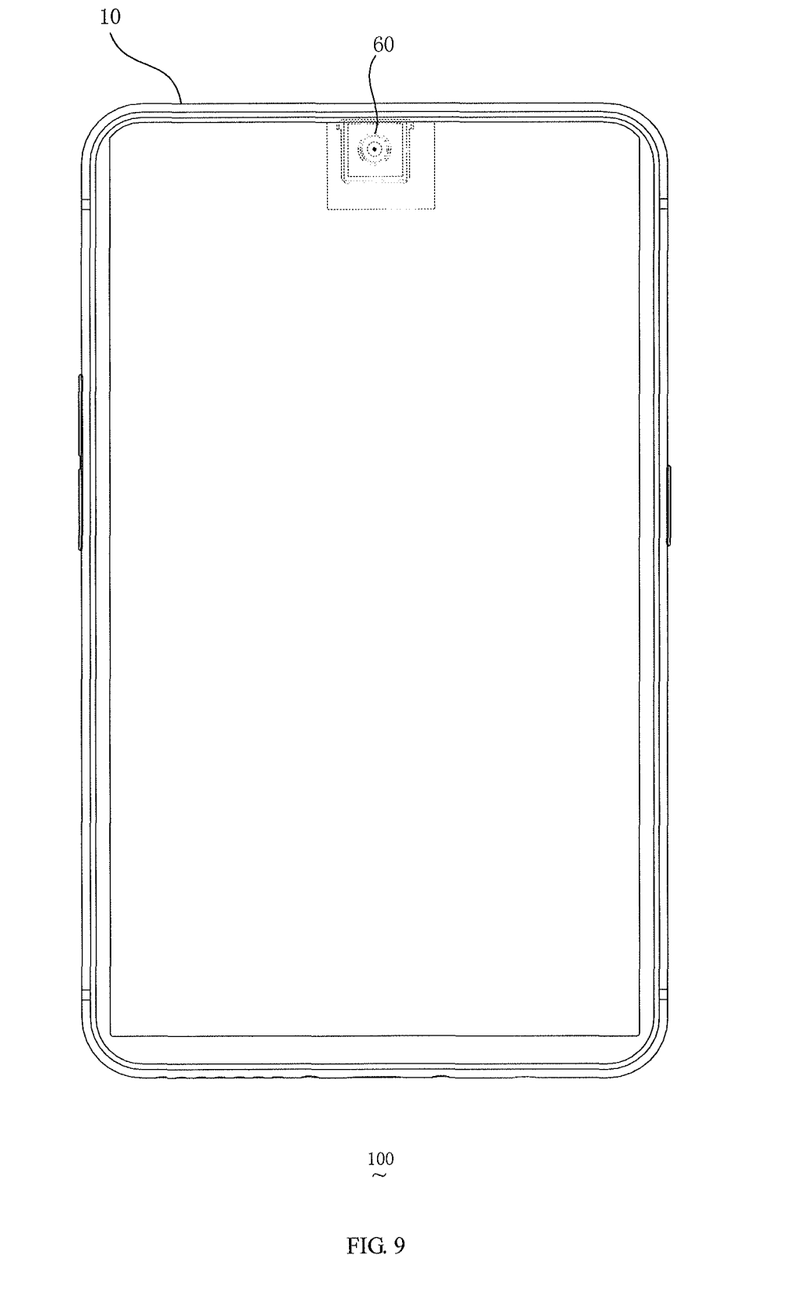
FIG. 9 is a front view of a electronic apparatus in FIG. 8, wherein the slidable device is at the second position.

Referring to FIG. 8, when the slidable device 60 is at the first position, the slidable device 60 may extend out of the housing 10 and be seen from an outside of the electronic apparatus 100, such that the slidable device 60 could be used to achieve its function. Referring to FIG. 9, when the slidable device 60 is at the second position, the slidable device 60 may retract into the housing 10 and further received in the housing 10, such that the slidable device 60 could be hided under the screen 20 and cannot be seen from the outside of the electronic apparatus 100.

In this way, it is possible to achieve a diversity of usages of the electronic apparatus 100, and improve the user experience. Furthermore, since the slidable device 60 is disposed in the housing 10 and under the screen 20, the slidable device 60 may no longer occupy any space of the display area, such that the display area could be designed as large as possible, and thus a ratio of the display area to a total area of the screen 20 could be increased. In addition, the volume of the mobile terminal could be reduced, thereby carrying or gripping the mobile terminal could be more convenient.

In order to prevent the slidable device 60 from over extending, when the slidable device 60 is at the first position, the mating body 54 may abut against the first side plate 44 (as shown in FIG. 4), such that the slidable bracket 50 cannot further extend.

In order to prevent the slidable device 60 from over retracting, when the slidable device 60 is at the second position, the mating body 54 may abut against the second side plate 48 (as shown in FIG. 3), such that the slidable bracket 50 cannot further retract.

In particularly, when the slidable device 30 is at the second position, part of the slidable device 60 may be received in the second opening 42a. Furthermore, the slidable device 60 may protrude relative to the bottom plate 42 through the second opening 42a. Therefore, the thickness of the fixed holder 40 could be thinner than that of the slidable device 60. As a result, the space occupied by the slidable assembly 30 could be reduced.

According to an exemplary embodiment, the slidable device 30 may include, but be not limited to, at least one component selecting from a group including the a camera module, an iris recognition module, a face recognition module, an LED flash, a microphone, a receiver, a photoreceptor, a fingerprint module, and a button.

Figure 10:
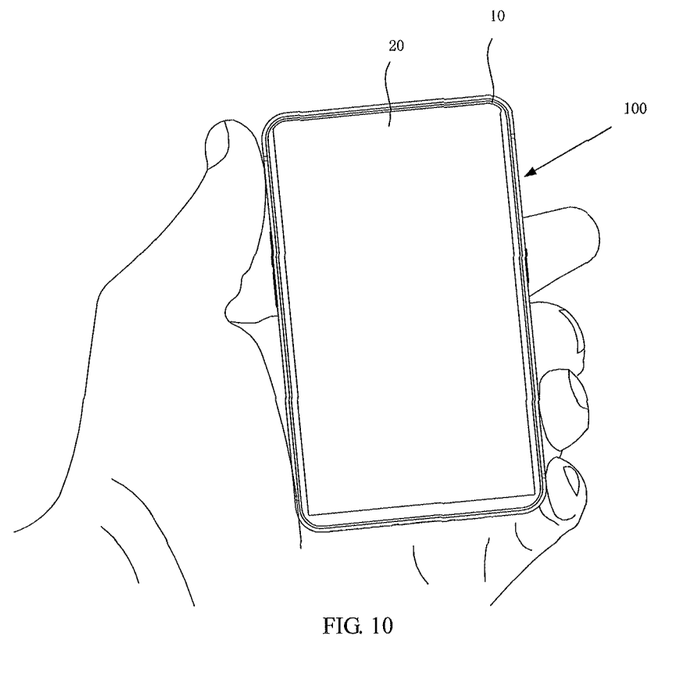
FIG. 10 is a schematic view of a electronic apparatus according to a further embodiment of the present disclosure, wherein the slidable device is at the second position.
Figure 11:
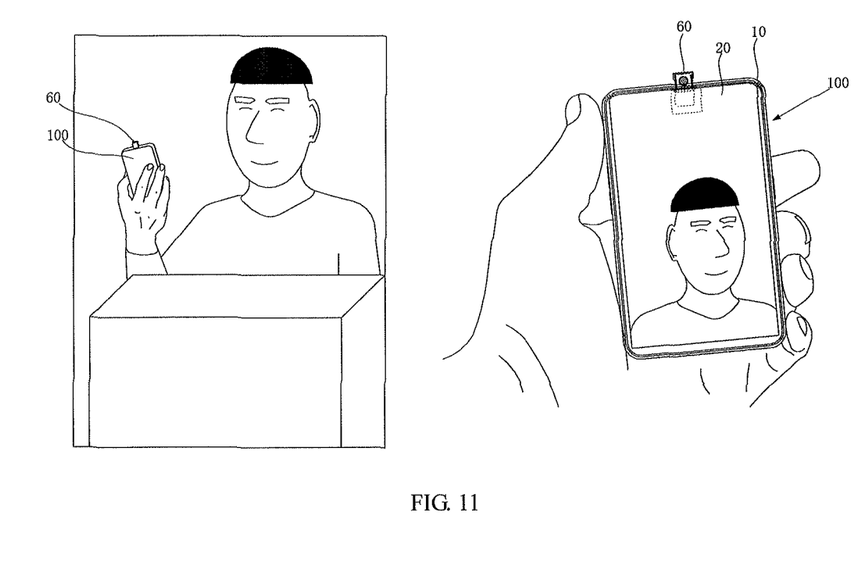
FIG. 11 is a schematic view of a electronic apparatus according to an embodiment of the present disclosure, wherein the slidable device is being used to take images and at the first position.

In an alternative embodiment, the slidable device 60 may be a camera module. Taking the slidable device 60 as a front-facing camera module for example, referring to FIG. 10, the front-facing camera module may be disposed in the housing 10 and hided under the screen 20. When a user wants to take images, he may input an instruction of taking images to the electronic apparatus 100. Then the front-facing camera module may be driven to extend out of the housing 10 by the electromagnetic element 70 via the through hole 142a, an image taking function may be achieved as a result, as shown in FIG. 11. Besides, the front-facing camera will not occupy the space of the screen 20, and it is unnecessary to define a hole for the front-facing camera on a glass substrate of the screen 20. In this way, a ratio of the display area to an area of the screen 20 may be increased, and manufacturing processes of the screen 20 may be reduced. After finishing taking images, the electromagnetic element 70 may drive the front-facing camera to retract into the housing 10 via the through hole 142a, and thus the front-facing camera may be protected from being impacted, damaged, eroded by water or dust, and the like.

The electromagnetic element 70, which may be a coil, may be fixed on the second side plate 48, arranged opposite to the magnet 56 and electrically connected to the controller 80. The electromagnetic element 70 and the magnet 56 may be arranged along the moving direction of the slidable device 60. The controller 80 may control direction of current provided to the coil, so as to change the magnetic poles of the electromagnetic element 70.

For example, the magnetic poles of the magnet 56 may be S-N along the moving direction of the slidable device 60. When the slidable device 60 is at the second position, the slidable device 60 may be positioned on between the first side plate 44 and the second side plate 48. When the user inputs an instruction of starting the slidable device 60, the controller 80 may control direction of current provided to the electromagnetic element 70 to be a first direction, such that the magnetic poles of the electromagnetic element 70 may be N-S along the moving direction of the slidable device 60. That is, the magnetic pole of the electromagnetic element 70 faced to the magnet 56 may be the same as the magnetic pole of the magnet 56 faced to the electromagnetic element 70. Therefore, the magnet 56 may be repulsed to the electromagnetic element 70 and driven to move away from the electromagnetic element 70. As a result, the slidable bracket 50 may be driven to move away from the electromagnetic element 70 along the guiding rods 41, and the slidable device 60 may be forced to the first position.

After using the slidable device 60, the user may input an instruction of turning off the slidable device 60, the controller 80 may change direction of current provided to be a second direction reversing to the first direction, such that the magnetic poles of the electromagnetic element 70 may be S-N along the moving direction of the slidable device 60. That is, the magnetic pole of the electromagnetic element 70 faced to the magnet 56 may be different from the magnetic pole of the magnet 56 faced to the electromagnetic element 70. Therefore, the magnet 56 may be attracted to the electromagnetic element 70 and driven to move toward the electromagnetic element 70. As a result, the slidable bracket 50 may be driven to move toward the electromagnetic element 70 along the guiding rods 41, and the slidable device 60 may be pulled to the second position.

In some embodiments, the slidable device 60 may be kept at the first position by repulsive force generated between the magnet 56 and the electromagnetic element 70. The slidable device 60 may be kept at the second position by attractive force generated between the magnet 56 and the electromagnetic element 70.

In addition, the controller 80 could further control the magnitude of the current provided to the electromagnetic element 70, so as to control the magnitude of the magnetic force between the electromagnetic element 70 and the magnet 56. Therefore, slidable device 60 could be controlled to be at any position between the first position and the second position by controlling the magnitude of the magnetic force.

In one aspect of the present disclosure, a camera assembly may be provided. The camera assembly may include a fixed holder, sliding means connected to the fixed holder, configured to move relative to the fixed holder and including a magnet, a camera module arranged on the sliding means and configured to move between a first position at which the camera module extends out of the fixed holder and a second position at which the camera module retracts into the fixed holder with movement of the sliding means and an electromagnetic element, arranged on the fixed holder and configured to generate repulsive force and attractive force to the magnet to drive the sliding means to move, such that the camera module could move between the first position and the second position.

In an embodiment, the fixed holder may include a guiding element extending along a moving direction of the sliding means. The sliding means may further include a main body defining a first slot configured to receive the camera module and a mating body connected to the main body and configured to match with the guiding element to guide the movement of the sliding means.

In another embodiment, the mating body may define at least one guiding hole, the guiding element may include at least one guiding rod passing through the at least one guiding hole.

In still another embodiment, the mating body may define a second slot, the magnet may be received in the second slot, the electromagnetic element and the magnet may be arranged along the moving direction of the sliding means.

In further embodiment, the main body may define a second slot, the magnet may be received in the second slot, the electromagnetic element and the magnet may be arranged along the moving direction of the sliding means.

In still further embodiment, the main body may include a bottom wall in the first slot, the bottom wall may define a through hole for light to penetrate to enter the camera module.

In an embodiment, fixed holder may further include a bottom plate substantially parallel to the moving direction of the sliding means, a first side plate extending substantially perpendicularly from an end of the bottom plate and defining a first opening and a second side plate extending substantially perpendicularly from the other end of the bottom plate and opposite to the first side plate. An end of the at least one guiding rod may be connected to the first side plate, the other end of the at least one guiding rod may be connected to the second side plate, the electromagnetic element may be fixed on the second side plate, the second position may be between the first side plate and the second side plate, the camera module may be configured to extend out of or retract into the fixed holder through the first opening.

In another embodiment, the mating body may be arranged between the guiding rods, the mating body may include two mating portions, one of the mating portions may be arranged on one side of the main body and define one of the guiding holes, the other one of the mating portions may be arranged on the other side of the main body and define the other one of the guiding holes.

In still another embodiment, when the camera module is at the first position, the mating body may abut against the first side plate to stop the camera module from extending. When the camera module is at the second position, the mating body may abut against the second side plate to stop the camera module from retracting.

In further another embodiment, the end of the guiding rod may pass through the first side plate and be connected to a stop member, and the other end of the guiding rod may pass through the second side plate and be connected to another stop member, such that the guiding rod may be kept being connected to the first side plate and the second side plate.

In still further another embodiment, the bottom plate may define a second opening communicating with the first opening, the camera module may protrude relative to the bottom plate through the second opening.

In an embodiment, the fixed holder may further include a bottom plate substantially parallel to the moving direction of the sliding means, a first side plate extending substantially perpendicularly from an end of the bottom plate and a second side plate extending substantially perpendicularly from the other end of the bottom plate and opposite to the first side plate. The first side plate and the second side plate may be substantially parallel to the moving direction of the sliding means, the guiding element may include two guiding rails, one of the guiding rails may be provided on the first side plate, the other one of the guiding rails may be provided on the second side plate. The mating body may be arranged between the first side plate and the second side plate, the mating body may define two guiding grooves, one of the guiding rails may be inserted into one of the guiding groove, the other one of the guiding rails may be inserted into the other one of the guiding grooves.

In an embodiment, the electromagnetic element may be a coil.

In another embodiment, the camera module may be kept at the first position by the repulsive force, and the camera module may be kept at the second position by the attractive force.

According to a second aspect of the present disclosure, an electronic apparatus may be provided. The electronic apparatus may include a housing, a screen engaged with the housing to define a chamber and a slidable assembly received in the chamber. The slidable assembly may include a fixed holder fixed on the housing, a slidable bracket connected to the fixed holder, configured to move relative to the fixed holder and including a magnet, a slidable device arranged on the slidable bracket and configured to move between a first position at which the slidable device extends out of the chamber and a second position at which the slidable device retracts into the chamber with movement of the slidable bracket and an electromagnetic element arranged on the fixed holder. The electromagnetic element and the magnet may be arranged along a moving direction of the slidable device, when the magnet is repulsed to the electromagnetic element, the slidable bracket may be driven to move away from the electromagnetic element such that the slidable device may be forced to the first position. When the magnet is attracted to the electromagnetic element, the slidable bracket may be driven to move toward the electromagnetic element such that the slidable device may be pulled to the second position.

According to a third aspect of the present disclosure, a mobile terminal may be provided. The mobile terminal may include a front shell, a back shell connected to the front shell, a screen embedded in the front shell and covering the back shell, a slidable assembly received in the back shell and a controller. The slidable assembly may include a fixed holder fixed on the back shell, a slidable bracket connected to the fixed holder, configured to move relative to the fixed holder and including a magnet, a slidable device arranged on the slidable bracket and configured to move between a first position at which the slidable device extends out of the back shell and a second position at which the slidable device retracts into the back shell with movement of the slidable bracket and an electromagnetic element fixed on the fixed holder. The electromagnetic element and the magnet may be arranged along a moving direction of the camera module. The controller may be connected to the electromagnetic element and configured to control direction of current provided to the electromagnetic element to exchange magnetic poles of the electromagnetic element, such that the magnet may be repulsed or attracted to the electromagnetic element to drive the slidable device to move between the first position and the second position.

For one skilled in the art, it is clear that the present application is not limited to the details of the above exemplary embodiments, and that the present application can be implemented in other specific forms without deviating from the spirit or basic characteristics of the application. Therefore, at any point, the embodiments should be regarded as exemplary and unrestrictive, and the scope of the present application is defined by the appended claims, rather than the above description. Therefore, all changes within the meaning and scope of the equivalent elements of the claim is intended to be included. Any appended label recited in the claims shall not be regarded as a limitation to the claims. In addition, apparently, the terms "include", "comprise" and the like do not exclude other units or steps, and the singular does not exclude plural.

It should be noted that, the foregoing disclosed is merely exemplary implementations and it is not intended to limit the scope of the present disclosure. Although the present disclosure is described in details with reference to the above embodiments, however, one skilled in the art may make any modification or equivalence based on the technical solution and the inventive concept of the present disclosure. All these modifications and equivalences shall all be covered within the protection claimed in the claims of the present disclosure.

What is claimed is:

1. A camera assembly, comprising:
   a fixed holder;
   a sliding means, connected to the fixed holder and configured to move relative to the fixed holder, wherein the sliding means comprises a magnet;
   a camera module, arranged on the sliding means and configured to move between a first position at which the camera module extends out of the fixed holder and a second position at which the camera module retracts into the fixed holder with movement of the sliding means; and
   an electromagnetic element, arranged on the fixed holder and configured to generate repulsive force and attractive force to the magnet to drive the sliding means to move, such that the camera module moves between the first position and the second position.

2. The camera assembly according to claim 1, wherein the fixed holder comprises a guiding element extending along a moving direction of the sliding means;
   the sliding means further comprises:
   a main body, defining a first slot configured to receive the camera module; and
   a mating body, connected to the main body and configured to match with the guiding element to guide the movement of the sliding means.

3. The camera assembly according to claim 2, wherein the mating body defines at least one guiding hole, the guiding element comprises at least one guiding rod passing through the at least one guiding hole.

4. The camera assembly according to claim 3, wherein the mating body defines a second slot, the magnet is received in the second slot, the electromagnetic element and the magnet are arranged along the moving direction of the sliding means.

5. The camera assembly according to claim 3, wherein the main body defines a second slot, the magnet is received in the second slot, the electromagnetic element and the magnet are arranged along the moving direction of the sliding means.

6. The camera assembly according to claim 3, wherein the main body comprises a bottom wall in the first slot, the bottom wall defines a through hole for light to penetrate to enter the camera module.

7. The camera assembly according to claim 3, wherein the fixed holder further comprises:
   a bottom plate, substantially parallel to the moving direction of the sliding means;
   a first side plate, extending substantially perpendicularly from an end of the bottom plate and defining a first opening; and
   a second side plate, extending substantially perpendicularly from the other end of the bottom plate and opposite to the first side plate;
   wherein an end of the at least one guiding rod is connected to the first side plate, the other end of the at least one guiding rod is connected to the second side plate, the electromagnetic element is fixed on the second side plate, the second position is between the first side plate and the second side plate, the camera module is configured to extend out of or retract into the fixed holder through the first opening.

8. The camera assembly according to claim 7, wherein the at least one guiding rod is two guiding rods arranged opposite to each other;
   the at least one guiding hole is two guiding holes, the mating body is arranged between the guiding rods, the mating body comprises two mating portions, one of the mating portions is arranged on one side of the main body and defines one of the guiding holes, the other one of the mating portions is arranged on the other side of the main body and defines the other one of the guiding holes.

9. The camera assembly according to claim 7, wherein when the camera module is at the first position, the mating body abuts against the first side plate to stop the camera module from extending; when the camera module is at the second position, the mating body abuts against the second side plate to stop the camera module from retracting.

10. The camera assembly according to claim 9, wherein the end of the guiding rod passes through the first side plate and is connected to a stop member, and the other end of the guiding rod passes through the second side plate and is connected to another stop member, such that the guiding rod is kept being connected to the first side plate and the second side plate.

11. The camera assembly according to claim 7, wherein the bottom plate defines a second opening communicating with the first opening, the camera module protrudes relative to the bottom plate through the second opening.

12. The camera assembly according to claim 2, wherein the fixed holder further comprises:
   a bottom plate, substantially parallel to the moving direction of the sliding means;
   a first side plate, extending substantially perpendicularly from an end of the bottom plate; and
   a second side plate, extending substantially perpendicularly from the other end of the bottom plate and opposite to the first side plate;
   wherein the first side plate and the second side plate are substantially parallel to the moving direction of the sliding means, the guiding element comprises two guiding rails, one of the guiding rails is provided on the first side plate, the other one of the guiding rails is provided on the second side plate;
   the mating body is arranged between the first side plate and the second side plate, the mating body defines two guiding grooves, one of the guiding rails is inserted into one of the guiding groove, the other one of the guiding rails is inserted into the other one of the guiding grooves.

13. The camera assembly according to claim 1, wherein the electromagnetic element is a coil.

14. The camera assembly according to claim 1, wherein the camera module is kept at the first position by the repulsive force; and the camera module is kept at the second position by the attractive force.

15. An electronic apparatus, comprising:
   a housing;
   a screen engaged with the housing to define a chamber; and
   a slidable assembly received in the chamber and comprising:
      a fixed holder, fixed on the housing;
      a slidable bracket, connected to the fixed holder and configured to move relative to the fixed holder, wherein the slidable bracket comprises a magnet;
      a slidable device, arranged on the slidable bracket and configured to move between a first position at which the slidable device extends out of the chamber and a second position at which the slidable device retracts into the chamber with movement of the slidable bracket; and
      an electromagnetic element, arranged on the fixed holder;
   wherein the electromagnetic element and the magnet are arranged along a moving direction of the slidable device, when the magnet is repulsed to the electromagnetic element, the slidable bracket is driven to move away from the electromagnetic element such that the slidable device is forced to the first position; when the magnet is attracted to the electromagnetic element, the slidable bracket is driven to move toward the electromagnetic element such that the slidable device is pulled to the second position.

16. The electronic apparatus according to claim 15, wherein the fixed holder further comprises a guiding element extending along a moving direction of the slidable bracket;
   the slidable bracket further comprises:
   a main body, defining a first slot configured to receive the slidable device; and
   a mating body, connected to the main body and configured to match with the guiding element to guide the movement of the slidable bracket.

17. The electronic apparatus according to claim 16, wherein the slidable device is kept at the first position by repulsive force; and the slidable device is kept at the second position by attractive force.

18. A mobile terminal, comprising:
   a front shell;
   a back shell connected to the front shell;

a screen embedded in the front shell and covering the back shell;
a slidable assembly received in the back shell and comprising:
   a fixed holder, fixed on the back shell;
   a slidable bracket, connected to the fixed holder and configured to move relative to the fixed holder, wherein the slidable bracket comprises a magnet;
   a slidable device, arranged on the slidable bracket and configured to move between a first position at which the slidable device extends out of the back shell and a second position at which the slidable device retracts into the back shell with movement of the slidable bracket; and
   an electromagnetic element, fixed on the fixed holder, wherein the electromagnetic element and the magnet are arranged along a moving direction of the camera module; and
a controller, connected to the electromagnetic element and configured to control direction of current provided to the electromagnetic element to exchange magnetic poles of the electromagnetic element, such that the magnet is repulsed or attracted to the electromagnetic element to drive the slidable device to move between the first position and the second position.

19. The mobile terminal according to claim 18, wherein the fixed holder further comprises a guiding element extending along a moving direction of the slidable bracket;
the slidable bracket further comprises:
   a main body, defining a first slot configured to receive the slidable device; and
   a mating body, connected to the main body and configured to match with the guiding element to guide the movement of the slidable bracket.

20. The mobile terminal according to claim 19, wherein the slidable device is kept at the first position by repulsive force; and the slidable device is kept at the second position by attractive force.

* * * * *